Nov. 16, 1965   R. N. MOTSINGER   3,218,595
RESILIENT MOUNTING DEVICE FOR SLIP-RING ASSEMBLIES
Filed Jan. 24, 1961   2 Sheets-Sheet 1

INVENTOR
RICHARD N. MOTSINGER
BY
*Francis H. Beebe*
ATTORNEY

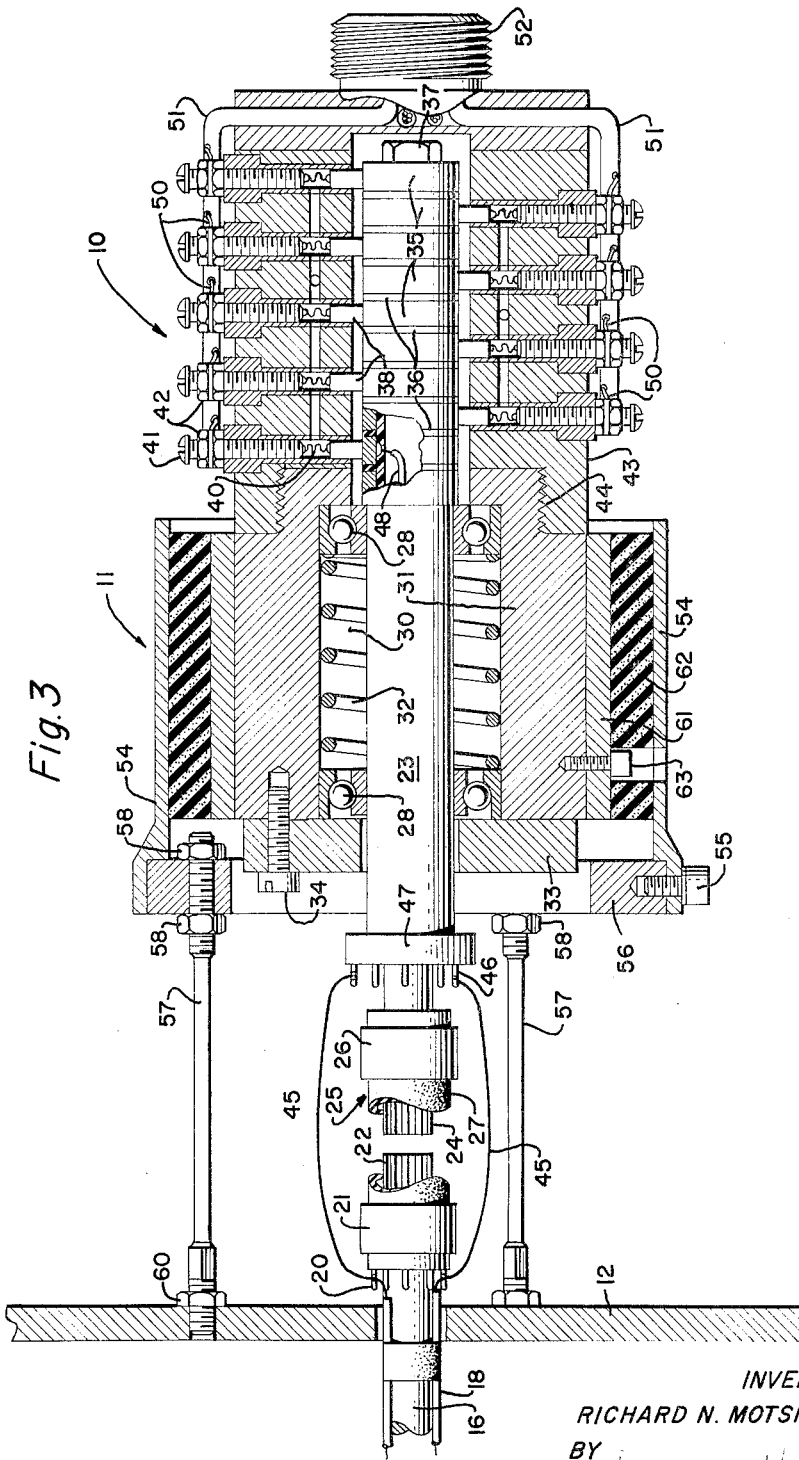

United States Patent Office 3,218,595
Patented Nov. 16, 1965

3,218,595
RESILIENT MOUNTING DEVICE FOR SLIP-RING ASSEMBLIES
Richard N. Motsinger, Phoenix, Ariz., assignor to The Garrett Corporation, Los Angeles, Calif., a corporation of California
Filed Jan. 24, 1961, Ser. No. 84,640
7 Claims. (Cl. 339—5)

This invention relates to slip rings that are used in certain types of testing instrumentation, and aims to provide a mounting device for such slip rings which eliminates undesirable vibration.

In the manufacture of rotating machinery, such as motors and turbines, various test data are often obtained through the use of slip rings. For example, static and dynamic strain of centrifugal origin, bending and torsion within shafting, and similar conditions, may be studied with strain and temperature phenomena from the rotating members; and such phenomena are handled with instrumentation including slip rings. If the predominant frequencies of the machine under test are low, the use of a flexible coupling between the machine and the slip ring assembly may be sufficient to remove undesirable vibrations. But in gas turbine testing, the high rotational speeds and the number of blades in the turbine wheel combine to produce excitation frequencies in the order of tens of thousands per second. These vibrations appear to penetrate the slip ring assembly and excite the ball bearings, the cantilever ring mandrel, and the brushes sufficiently to cause damage to the brushes and also render any test data completely unreadable and inaccurate. While metallic woll and mercury brushes have been suggested and use to some advantage, such modified brushes or sliding contacts require costly alteration of the usual slip ring assembly.

It is therefore an object of this invention to provide a mounting device for the usual slip ring assembly which eliminates the difficulties formerly encountered in the use of slip rings with high-speed rotating machinery.

Another object of the invention is to provide a mounting device for a slip ring assembly which makes it possible to retain the conventional sliding contacts under environmental influences that previously limited their application.

A further object of this invention is to provide an extended isolation mount for a conventional slip ring assembly which substantially eliminates all undesirable vibrations when used with high-speed rotating machines, thus reducing shutdowns for repair of the slip rings and associated parts and wiring.

It is another object of this invention to provide an improved mounting device for a slip ring assembly used in testing high-speed rotary machines, which mounting is constructed and arranged to permit the slip ring assembly to act as a seismic mass and float free of high-frequency vibrations emanating from the machine being tested.

Still another object is to provide a mounting apparatus for a slip ring assembly which prevents both axial and transverse vibrations from exciting the slip ring brushes.

Another object of this invention is to provide a mounting apparatus for a conventional slip ring assembly which comprises a mounting member, a plurality of standoff legs for attaching the mounting member to the machine being tested, and a resilient liner in said mounting member shaped to receive the slip ring assembly.

The above and other objects and advantages of the invention will be apparent from the following description and the accompanying drawings, in which:

FIG. 3 is a vertical sectional view of the mounting device and slip ring assembly shown in FIGS. 1 and 2.

Figure 1:
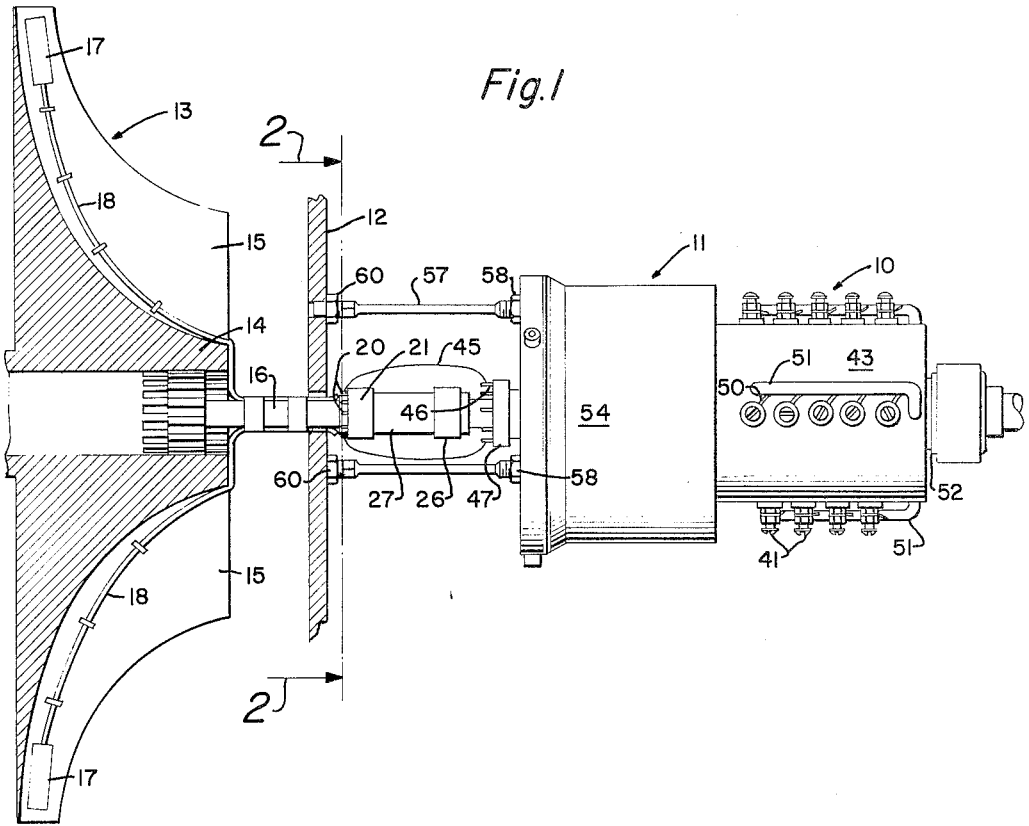
FIG. 1 is an elevational view, with portions omitted and in section, showing the principles of the invention applied to a conventional slip ring assembly for testing the wheel of a high-speed gas turbine.

Referring now to the drawings, a conventional slip ring assembly 10 is attached through a mounting device 11 embodying the principles of this invention, to an outer casing or cover plate 12 of a turbine 13. The turbine 13 is an example of a high-speed rotating machine which may be tested and comprises a turbine wheel 14 having blades 15 and a rotating shaft 16 which extends through the side plate or casing 12. In the testing of a turbine wheel, such as the wheel 14, it may be desired to study the strains or temperature conditions in the blades 15 during various speeds and conditions of rotation. To do this, strain gages, thermocouples or other suitable measuring or sensing devices 17 may be mounted on the blade for the purpose of sensing the particular condition being studied or tested and causing a variation in current flow which can be measured and correlated with changes in the condition being studied. Such sensing devices are well known and are usually included in electrical circuits connected to suitable meters or other indicating instruments (not shown). The slip ring assemby 10 constitutes the means for transmitting the electric current changes from the turbine blades 15 through the rotating shaft 16 to the indicating instrumentation. Thus, the strain gages 17 are connected by wires 18, which run along the blades and pass through suitable grooves in the shaft 16 to corresponding pins 20 on a collar or bobbin 21 which is mounted on the splined end 22 of shaft 16.

FIG. 3 shows the details of the slip ring assembly 10, and it will be noted that said assembly comprises a shaft 23 having a splined end 24 so that it may be operatively connected to the splined end 22 of the shaft 16 by means of a suitable flexible coupling designated generally by the numeral 25, FIG. 3. In the present instance, the flexible coupling 25 includes the collar 21, a short piece 27 of rubber hose, or other suitably resilient tubing and a second collar 26, the hose being held in position on the splined shaft ends 22 and 24 by the collars 21 and 26 and constituting the driving connection between the shafts 16 and 23. Shaft 23 is mounted for rotation in bearings 28 positioned in a cylindrical cavity 30 in a slip ring housing body 31 and resiliently held in properly spaced relation by a spring 32. A cover plate 33 attached to the housing body 31 with screws 34 closes the cavity and holds the bearings in their spaced relation in the cavity 30. The outer end of shaft 23 is slightly reduced in diameter for the reception of a plurality of conventional slip rings 35 which are insulated from the shaft and insulated and spaced from one another by washers 36 and held on the shaft by a bolt 37. Each slip ring 35 has one or more cooperating brushes 38, resiliently and adjustably held in contact therewith. A spring 40 provides the desired resiliency and a screw 41 and lock nuts 42 hold the parts in any adjusted position. The slip rings and associated parts are contained within a housing or mandrel 43 which is threaded at 44 to a reduced and threaded end of the bearing housing 31, said two housings constituting the main sections of the slip ring assembly 10.

It is the purpose of the slip ring assembly to provide a means for transmitting the current changes from the measuring devices 17 to the indicating instrumentation. Accordingly, the pins 20 of bobbin 21 are connected by suitable wires 45 to corresponding pins 46 on a bobbin or supporting collar 47, and these pins 46 are connected to corresponding slip rings 35 by wires 48 passing through a groove or passage provided in the shaft 23. Since the wires 45, which may be copper-coated music wire, rotate at the speed of the shafts 16 and 23, it is important that they be effectively soldered or otherwise secured to their proper bobbin pins so that electrical connections will not be interrupted during high-speed operation. Each slip ring is then connected by a wire 50 which is part of a cable 51 leading through a threaded conduit coupling 52 to the electrical instrumentation (not shown), all as is well known in the art.

In the usual slip ring construction, the assembly thus far described is attached to the frame or plate 12 of the turbine by means of a rigid cylindrical sleeve. With such a method of mounting, the flexible coupling 25 constitutes the only means of reducing the transmission of vibrations from the rotating turbine wheel 14 to the slip ring assembly 10. It has been found, as mentioned above, that when the turbine operates at speeds of 35,000–40,000 r.p.m., the circuit continuity is interrupted and physical damage to the brushes and bobbin wiring occur; and it has been determined that high levels of vibration are responsible for the misbehavior of the slip ring instrumentation.

Figure 2:
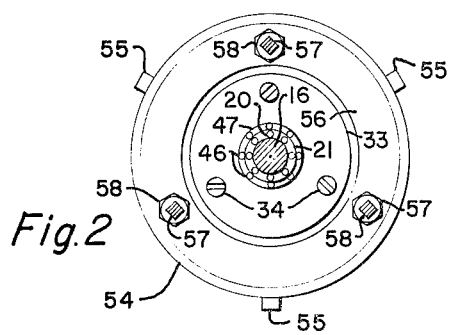
FIG. 2 is a view taken substantially along the line 2—2 of FIG. 1.

According to the present invention, the slip ring assembly is allowed to function accurately at turbine shaft speeds of 35,000–80,000 r.p.m. by attaching it to the turbine with the special mounting apparatus or device 11. As shown in FIG. 3, the mounting device 11 comprises a cylindrical collar or housing member 54 mounted with bolts 55 on a sturdy supporting base or ring 56 which is connected to the turbine wall by a plurality of elongated standoffs or mounting legs 57. Three legs 57 spaced 120° apart (FIG. 2) have been found to provide adequate support and these are threaded at each end and attached to the supporting ring 56 by nuts 58 on each side of said ring. Similar nuts 60 securely hold the legs in tapped openings provided in the turbine wall 12. It will be apparent that by adjustment of the position of the legs in the ring 56 and wall 12 and locking them with the nuts 58 and 60, the position of the entire slip ring assembly 10 with respect to the turbine wall may be varied so that the length and flexibility (or stiffness) of the legs 57 may be regulated and adjusted. In the same way, the space between the shaft ends 22 and 24 may also be adjusted to the desired gap of about ¼-inch to allow the tubing 27 to work freely enough to be effective in damping out some of the vibration. Experiment has also shown that with the present method of mounting, a slight misalignment of the shafts 16 and 23 causes no difficulty in operation and no special alignment procedures are required.

It has also been found that the isolation mount provided by the three standoff legs dissipates vibrations in all directions perpendicular to the shaft, and in addition, effects a torsional flexibility, thus eliminating substantially all of the highly accelerated transverse vibrations. The length of the standoff legs may be determined initially by the space available; and the diameter is such as to provide sufficient rigidity or stiffness to maintain the shafts 16 and 23 in approximate alignment or parallel relation and yet have enough flexibility to effect the desired isolation of the slip ring assembly and resulting dissipation of the undesirable transverse vibrations. When it is necessary to change the length of the standoff legs 57, due to space limitations, for example, the same isolation of the assembly may be retained by the following relation for stiffness:

$$\frac{B_1^3}{D_1^4} = \frac{B_2^3}{D_2^4}$$

where $B_1$ and $B_2$ are the lengths of the standoff legs and $D_1$ and $D_2$ are the respective diameters of the legs. The extended isolation mount provided by the standoff legs 57 also allows easy access to the wires and bobbins.

In order to prevent any undesirable longitudinal or axial vibrations from being transmitted along the standoff legs 57 to the slip ring assembly, the housing body 31 may be mounted in an inner cylindrical sleeve 61 which is concentric with the housing 54 and separated therefrom by a substantial layer 62 of compact, spongy, resilient material, such as sponge rubber or resilient polyurethane foam. This spongy layer 62 is a resilient sleeve or liner which aids further in providing the desired isolation of the slip ring mounting; and in additon to effecting axial isolation, the spongy layer dissipates and absorbs the undesirable axial vibrations. Bolts 63 may be used to lock the housing body 31, and hence the entire slip ring mandrel, in place in the sleeve 61 of the special mounting device 11. It has been found that the standoff legs 57, which dissipate undesirable transverse vibrations (perpendicular to the shaft), and the resilient mount for the housing, which dissipates and absorbs undesirable axial vibrations, isolate the slip ring assembly 10 and permit it to behave more nearly as a seismic mass; i.e., it floats and is substantially free of the vibrations of the turbine to which it is attached.

I claim:
1. A mounting apparatus for a slip ring assembly used in testing high-speed rotary machines, comprising: a mounting member; a plurality of elongated legs for attaching the mounting member to the machine being tested; and means in said mounting member for receiving and resiliently supporting the slip ring assembly.

2. A slip ring assembly for testing a high-speed turbine having a rotating shaft, comprising: a slip ring housing body having a shaft rotatably mounted therein; a flexible coupling for operatively connecting said slip ring shaft with the turbine shaft; a mounting member for said slip ring housing body; a plurality of elongated legs for attaching the mounting member to the frame of the turbine; and means for resiliently supporting said slip ring housing body in said mounting member.

3. A slip ring assembly for testing a high-speed machine having a rotating shaft, comprising: a slip ring housing body having a slip ring shaft rotatably mounted therein; a coupling for operatively connecting the slip ring shaft with the machine shaft; a mounting member for said slip ring housing body; and a plurality of elongated legs for attaching the mounting member to the machine being tested, said elongated legs being sufficiently rigid to maintain said shafts in substantially parallel relation to one another, and said legs being sufficiently long and resilient to isolate said slip ring housing body and dissipate the high-frequency transverse vibrations of said machine.

4. A mounting apparatus for a slip ring assembly used in testing high-speed rotary machines, comprising: a mounting member for receiving the slip ring assembly; a plurality of flexible standoff legs for attaching the mounting member to the machine to be tested and adapted to prevent high-frequency transverse vibrations produced by said machine from reaching said mounting member; and a resilient cushion liner inside said mounting member to separate the same from the slip ring assembly and prevent high-frequency axial vibrations produced by said machine from reaching said slip ring assembly.

5. Mounting apparatus for a slip ring assembly having a rotatable shaft and adapted for use in testing high-speed rotary machines, comprising: a mounting member of sleevelike form; a resilient liner in said mounting member to receive and resiliently support the slip ring assembly; and a plurality of elongated rodlike legs secured to the machine undergoing test and to said mounting member, said legs holding said slip ring assembly spaced from the machine with the shaft of the slip ring assembly generally in alignment with a rotary part of the machine undergoing test.

6. Mounting apparatus for a slip ring assembly having a rotatable shaft and adapted for use in testing high-speed rotary machines, comprising: a mounting member of sleevelike form; a plurality of elongated stiffly resilient legs secured to the machine undergoing test and to said mounting member and holding the latter spaced from the machine; a resilient liner in said mounting member to receive and resiliently support the slip ring assembly with the shaft thereof substantially aligned with and spaced from a rotary part of the machine; and a flexible driving connection between said shaft and said rotary part of the machine undergoing test, said flexible driving connection being disposed between the ends of said resilient legs.

7. Mounting apparatus for a slip ring assembly having a rotatable shaft and adapted for use in testing high-speed rotary machines, comprising: a mounting member of sleevelike form; a plurality of elongated stiffly resilient legs secured to the machine undergoing test and to said mounting member and holding the latter spaced from the machine; a resilient liner in said mounting member to receive and resiliently support the slip ring assembly with the shaft thereof substantially aligned with and spaced from a rotary part of the machine; and a flexible tubular rotary motion-transmitting element secured to said shaft and said rotary part of the machine undergoing test, said flexible tubular element being disposed between the ends of said resilient legs.

References Cited by the Examiner

UNITED STATES PATENTS

| | | | |
|---|---|---|---|
| 1,433,331 | 10/1922 | Angstrom | 339—5 |
| 1,953,960 | 4/1934 | Huffman | 339—5 |
| 2,096,621 | 10/1937 | Skolfield | 248—26 X |
| 2,231,490 | 2/1941 | Blancha | 339—93 X |
| 2,396,540 | 3/1946 | Stansfield | 70—70.1 |
| 2,498,126 | 2/1950 | Koch | 248—26 |
| 2,761,569 | 9/1956 | Iserman | 339—5 |
| 2,776,088 | 1/1957 | Wentling | 230—232 X |
| 2,883,132 | 4/1959 | Neher | 248—26 |
| 2,908,457 | 10/1959 | Loftis | 248—26 |
| 2,934,296 | 4/1960 | Gaubatz | 248—26 X |
| 3,022,479 | 2/1962 | Rohrbach | 339—8 |

FOREIGN PATENTS 1,089,032   9/1960   Germany.

ALBERT H. KAMPE, *Primary Examiner.*

MILTON O. HIRSCHFIELD, JOSEPH D. SEERS,
*Examiners.*